Patented Nov. 28, 1939

2,181,800

UNITED STATES PATENT OFFICE 2,181,800

COLLOIDIZED AZO COLORING MATTER

Moses L. Crossley, Plainfield, Roy H. Kienle, Bound Brook, and Alfred L. Peiker, East Bound Brook, N. J., assignors to The Calco Chemical Co., Inc., Bound Brook, N. J., a corporation of Delaware No Drawing. Application June 23, 1937, Serial No. 149,924

5 Claims. (Cl. 134—58)

This invention relates to new colloidized azo pigments.

Azo coloring matters are divided into two general classes, namely those which contain solubilizing groups and which can therefore be used in water solution or dispersion, and those which do not contain such groups and are therefore water insoluble and behave like a pigment. It is this latter class of compounds to which the present invention relates.

In the past, it has been difficult to use azo pigments because of the trouble of dispersing them. When prepared, the pigment is precipitated in the form of very finely divided particles, the particle size depending on the particular pigment and on the conditions under which it is prepared. It is possible to keep the wet precipitate in the form of paste which has fairly good dispersibility but once the material is dried, the individual particles stick together in the form of rather large aggregates and when ground to a powder the powder will not disperse uniformly or rapidly in an aqueous medium. This has made it impractical in most cases to market azo pigments in the form of powders because the redispersion of such pigments has necessitated excessive agitation and even with heavy agitation the aggregates are not all broken up and therefore material colored with such dispersion shows spots or specks where unbroken aggregates are present.

The addition of dispersing or wetting agents alone to an azo pigment in some cases will increase the speed with which it disperses on adding it to an aqueous medium and which property will be referred to throughout this specification and claims as autodispersibility and will be defined quantitatively below. However, even though the autodispersibility is increased to some extent, the total dispersibility is far from satisfactory.

As a result of the above disadvantages, the use of azo pigments in aqueous media has been very seriously limited, despite the fact that coloring with a thoroughly dispersed insoluble azo color presents numerous advantages over the use of soluble azo dyes; for example, the coloring of concrete plaster or artificial stone, aqueous dispersions of synthetic resins such as urea and formaldehyde resins, aqueous dispersions of nitrocellulose lacquers, paper coloring and the like, is more effective when a pigment is used because of its greater permanency. Also, in the case of the coloring of concrete or artificial stone, the pigment can be incorporated in the mix itself and therefore the color runs through the entire mass whereas if the concrete or artificial stone is tinted with a soluble dye, even if steps are later taken to then render the dye insoluble, the color is mainly on the surface and does not penetrate through the whole material. The waterproofing of concrete and artificial stone also makes it necessary to use a pigment rather than a soluble dye. Other uses in which a thoroughly dispersed azo pigment is desirable is the dyeing of celanese, coloring of fruit, wall paper, distemper paints, water inks, latex emulsions, and the like.

The present invention removes the disadvantages formerly encountered in the use of azo dye pigments and particularly azo dye powders. According to the present invention, the individual dye particles or at least a vast majority of them, are coated with a thin film of a hydrophilic protective agent which is sufficiently elastic to prevent cracking. When the material is dried at a sufficiently low temperature to prevent cracking of the protective agent film or removing its hydrophilic power the powder produced when added to an aqueous medium, disperses with great rapidity, in some cases with the same rapidity as a miscible liquid. An even more important property is that the individual dye particles which are kept separated from each other in the powder by the coating of a protective agent, are kept apart in the dispersion so that the total dispersion is extraordinarily complete and is free from specks due to undispersed aggregates. In fact, the present invention permits total dispersion of a degree of fineness which is limited only by the ultimate particle size of the pigment when prepared.

While the present invention is not limited in its broader aspects to any particular process of coating the individual dye particles, an improved process is also included. This process consists of mixing or kneading the pigment and protective agent in the form of a paste sufficiently stiff so that the individual particle aggregates are broken up by the shearing action and the majority of the individual dye particles are coated with the film of protective agent. This process can be carried out in any of the ordinary types of dough mixers such as the Werner and Pfleiderer mixer or Day kneading machines, or a Banbury mixer. While the only essential features of the process are kneading or mixing in a stiff paste and in the presence of a hydrophilic protective agent, it is desirable in many cases to use other types of agents in addition. Thus, for example, the mixing which is to effect deflocculation can be improved by the addition of deflocculating agents. Similarly, it is necessary normally to dilute the pigment and suitable diluting agents such as, for example, soluble carbohydrates or salt may be incorporated either in the mixing step or blended with the dry powder after drying. The addition of wetting agents in many cases will still further increase the autodispersibility and the tendency of the product to dust can be reduced by incorporating suitable anti-dusting agents.

The various types of materials which may be incorporated with the pigment and the protective agent, are not limited and in many cases a single ingredient may perform more than one function. Thus, for example, a deflocculating agent of the sulfonated di-arylmethane type not only acts as a deflocculating agent but is also a wetting agent. Some of the protective agents are at the same time good deflocculating agents such as, for example, dextrin, and the same compound therefore may perform both functions. Some of the antidusting agents are also wetting agents and here again the same substance may perform more than one function.

The invention is not broadly limited to the particular process set forth or to a particular sequence of addition of the various types of ingredients and insofar as the new products produced by the present invention is concerned, they may be prepared either by the preferred process of the present invention or by any other suitable process so long as a sufficient majority of the individual pigment particles are coated with the hydrophilic protective agent to effect the desired degree of autodispersibility and total dispersibility. A few of the typical ingredients are set out below but it should be understood that the invention is not limited to their use.

*Deflocculating agents*

Dextrin is an example of a commercial deflocculating agent. Various types of dextrin, including yellow dextrin may be used and they have the advantage over such deflocculating agents as tannic acid that they are also good protecting agents. A number of other carbohydrate colloids are also suitable. A second and preferred class of deflocculating agents are the synthetic tanning aids of the sulfonated diarylmethane type. The most common member is the sodium salt of disulfodinaphthylmethane. The latter deflocculating agent has a further advantage that it is also a wetting agent.

*Protective agents*

These agents are primarily colloidal materials which form films around the minute pigment particles which films are sufficiently elastic so that they do not crack off on drying and are preferably soluble in water, or at least take up water to swell. The commercially most attractive class of protecting agents are the carbohydrate colloids such as the dextrins. These agents give very satisfactory films, they are cheap and do not introduce into the pigment any components which would be harmful in the products which are to be colored by the pigment. Another typical protective agent is the alkali salt of lignin sulfonic acids which are obtained from the waste liquor of the sulfite process of producing wood pulp. While the above two classes of protective agents are the preferred examples, the invention includes the use of any other protective agent for example, gelatin, albumens, alkali, metal silicates, artificial or natural resinates, cholesterol, pectin, colloidal clays, etc., capable of forming a satisfactory film around the individual pigment particles.

*Diluting agents*

The preferred diluting agents are mainly carbohydrates such as sugar, dextrose, cerelose, xylose and the like. In fact, any of the common soluble carbohydrates are suitable. Other common diluting agents such as salts may also be used in certain cases. It is an advantage of the present invention that it is applicable to pigment pastes and dry powders containing the standard diluents used in the art. The invention is, however, not concerned with the use of any specific diluent and where a pigment in undiluted form is desired, the diluent may of course be eliminated.

*Wetting agents*

Any of the usual wetting agents can be used which are suitable for the particular conditions of alkalinity or acidity in the coloring process in which the pigment is to be used. The alkylnaphthalene sulfonates are among the best pure wetting agents and the readily commercially available products such as sodium isopropylnaphthalene sulfonate and sodium secondary butylnaphthalene sulfonate constitute preferred members. The synthetic tanning agents of the disulfodiarylmethane type such as disulfodinaphthylmethane, are also very effective and have the additional desirable feature as referred to above under Deflocculating agents, of serving as combined wetting and deflocculating agents. The alkali and alkaline earth metal salts of lignin sulfonic acids form another class of wetting agents which have the additional advantage of being at the same time protecting agents. Sodium salts of sulfonate lauryl, cetyl and similar high molecular alcohols, are also excellent wetting agents and may be used to advantage in the present invention. Another class of wetting agents are the ethers of polyglycols such as, for example, the ethyl ether of diethylene glycol. These wetting agents are also anti-dusting agents.

Examples of other compounds which are both wetting agents and anti-dusting agents are certain esters of ethers of simple polyhydric alcohols such as, for example, the acetates of the methyl, ethyl or butyl ether of ethylene glycol. These esters are in general combined anti-dusting and wetting agents when they are partially miscible with water.

The above enumeration of a few classes of wetting agents is not intended as limiting the invention to these products. They are typical of some of the well known wetting agents which have proven highly successful in the present invention and which are preferred, but any other wetting agent which does not introduce undesirable components into the final product may be employed.

*Antidusting agents*

These agents are mostly hygroscopic and tend to absorb sufficient water from the atmosphere to prevent the finely ground pigment from dusting. The earliest antidusting agent used was glycerine and this is effective. However, where a pure antidusting action is desired, the esters of ether alcohols with low molecular organic acids are preferred. Thus, for example, the acetates or formates of the ethyl, methyl or butyl ethers of ethylene glycol are antidusting agents of the highest efficiency. Similar esters of other ether alcohols and other low molecular organic acids may be used. The ethers are condensed polyhydric alcohols such as the ethyl ether of diethylene glycol, are also very effective and have the additional advantage that they are also wetting agents.

The invention is not concerned with any particular insoluble azo coloring matter, being generally applicable to all of them, although the products produced will show some variation because some of the pigments have a smaller ultimate particle size than do others and, of course, the present invention cannot produce an ultimate particle size that is smaller than that of the coloring matter as it is precipitated in formation. It is only the aggregates of particles which are deflocculated so as to coat the ultimate particles with the film of the hydrophilic protective agent.

As has been pointed out above, it is important that the final drying of the deflocculated product be carried out at a sufficiently low temperature so that the hydrophilic protective agent will not lose its hydrophilic property of absorbing water and swelling and will not tend to crack off from the dye particles. The particular temperatures which can be used in drying and also in subsequent grinding to form a powder will vary both with the particular protective agent used and with the pigment itself because certain azo coloring matters are very low melting and if either drying or grinding takes place above the melting point of the pigment, the pigment will melt, rupture the film of protective agent and coalesce with other melted particles. In the case of some low melting azo coloring matters, the melting point is very considerably below the temperature at which it is safe to dry the hydrophilic protective agent. In each case, it is necessary to choose a temperature sufficiently low so that neither the hydrophilic protective agent is injuriously affected nor the azo color is melted. Of course, the lower the temperature the better, but inasmuch as a lower temperature increases the cost of drying because it increases the time or requires high vacuum, it is commercially desirable to operate at as high a temperature as can be used without injuring the protective agent or without melting the color, and this maximum temperature will vary with different protective agents and with different azo colors.

The invention is not limited to the particular azo coloring matter and is generally applicable to all azo pigments, the examples which follow giving a number of common pigments of this character. It is an advantage of the invention that it is not restricted to particular azo pigments but is generally applicable to all of the known azo pigments.

The invention will be described in greater detail in conjunction with the following specific examples which set forth the preferred modifications of the invention.

*Example I*

1500 parts of a press cake containing an orange pigment prepared by diazotizing di nitro aniline and coupling on beta naphthol are placed in a Werner-Pfleiderer dough mixer along with 15 parts of sodium salt of the condensation product of formaldehyde with naphthalene sulfonic acid and 418 parts of yellow dextrine and the mass agitated for three hours. The rather thin slurry is then poured into trays, dried in vacuo at 65° and ground. The ground material is then re-introduced into the Werner-Pfleiderer dough mixer along with approximately 25% of water and the entire mass kneaded for 4 hours. The rather thick plastic magma is then poured into trays, dried in vacuo at 65° C. and pulverized. The dried concentrated powder is then reduced to the desired strength as follows:—

100 parts of the dried, concentrated pulverized powder is placed in a ball mill type blender along with 200 parts of cerelose and 3 parts of the ethyl ether of diethylene glycol. This produces a powder which wets out very readily and is anti-dusting, with a total dispersion of 99.8; an auto dispersion of 81.

*Example II*

700 parts of dry press cake of an orange pigment prepared by diazotizing di nitro aniline and coupling on beta naphthol are placed in a Werner-Pfleiderer dough mixer along with 1000 parts of yellow dextrine and 17 parts of the sodium salt of the condensation product of formaldehyde with naphthalene sulfonic acid and 400 parts of water. The dry pigment is rather bulky and some difficulty is encountered in working this material into the paste, hence, approximately six hours working is necessary in order to produce a thick plastic magma which is free from lumps. The rather thick mass is then thinned down by the addition of about 20% of water, poured into trays, and dried in vacuo at 65° C. and pulverized. The pulverized material is then re-introduced into the Werner-Pfleiderer dough mixer along with about 25% of water and worked into a thick plastic mass for 4 hours. The plastic mass is thinned down with about 20% of water, poured into trays, and dried in vacuo at temperature not exceeding 65° C. and pulverized. The dry pulverized material is then cut to the desired strength by the introduction of 100 parts of the material into a ball mill type blender along with 200 parts of cerelose and 3 parts of ethyl ether of diethylene glycol. This produces an anti-dusting powder which disperses rapidly and thoroughly, with a total dispersion number greater than 96.8; an auto dispersion number greater than 80.

*Example III*

2000 parts of a press cake containing a yellowish red pigment which is prepared by diazotizing ortho chlor para nitro aniline and coupling on beta naphthol containing 400 parts of dry dyestuff are placed in a Werner-Pfleiderer dough mixer along with 20 parts of the sodium salt of the condensation product of formaldehyde with naphthalene sulfonic acid and 572 parts of yellow dextrine. The rather thin slurry which results is kneaded for 3 hours. The thin slurry is then poured into trays, dried in vacuo at 65° C. and pulverized. The pluverized material is then re-introduced into the Werner-Pfleiderer dough mixer along with 25% of water and kneaded as a thick plastic magma for 3 hours. This magma is then thinned down somewhat with the addition of 20% of water and poured into trays, dried in vacuo at 65° C. and pulverized. The dry concentrated material is then cut to the desired strength by introducing 100 parts of the dry pulverized material into a ball mill type blender along with 200 parts of cerelose and 3 parts of the butyl ether of diethylene glycol. This results in a dilute powder which wets out very readily and which has the added factor of being anti-dusting. The concentrated powder has a total dispersion of 94.3 in cold water; auto dispersion of 75.

Example IV 100 parts of a yellow pigment prepared by diazotizing meta nitro para toluidine and coupling on acetacetanilide are slowly added to 1200 parts of 93% sulfuric acid which has been cooled to 0° C. The temperature is maintained at 0° C. during the entire period during which a clear amber colored solution is obtained. This solution which is free from lumps is then slowly added to an equal volume of a mixture of ice and water. (Care being taken to keep the temperature of this mixture below 15° C.) The yellow slurry is then diluted by the addition of 20 volumes of cold water and the yellow precipitation filtered on a suction filter and washed free from acid.

785 parts of the press cake described above containing 91 parts of real dyestuff are placed in a Werner-Pfleiderer dough mixer along with 2 parts of the sodium salt of the condensation product of formaldehyde and naphthalene sulfonic acid and 91 parts of yellow dextrine and agitated until a smooth thin paste is obtained. The thin slurry is then poured into trays, dried in an ordinary air dryer at 80° C. and ground. The ground material is re-introduced into the dough mixer along with about 25% by weight of water and the resultant plastic mass kneaded for 3 hours, poured in trays, dried in vacuo at 65° C. and pulverized. The concentrated powder is cut to the desired strength by placing it in a ball mill type blender along with the requisite quantity of cane sugar and 1 per cent of the ethyl ether of diethylene glycol. The resulting product is anti-dusting and possesses a total dispersion of 92.4; auto dispersion of 82.5.

Example V 386 parts of a press cake containing 94.5 parts of a yellowish red pigment which is prepared by diazotizing ortho chloro nitro aniline and coupling on beta naphthol are placed in a Werner-Pfleiderer dough mixer along with 2 parts of sodium salt of the condensation product of formaldehyde with beta naphthalene sulfonic acid and 137 parts of the sodium salt of lignin sulfonic acid. The rather thin slurry is stirred for 3 hours, poured into trays, and dried in an air dryer at 90° C.

The dry material is then ground and re-introduced into the Werner-Pfleiderer dough mixer along with about 25% of water and worked as a thick plastic material for 3 hours. This mass is then thinned down somewhat by addition of 20% of water, poured into trays and dried in vacuo at 65° C. maximum temperature. The dry material is then pulverized and cut to the desired strength by blending in a ball mill type blender with cerelose and ethyl ether of diethylene glycol. The ratio used in this blend is 100 parts concentrated powder, 200 parts of cerelose, and 3 parts of ethyl ether of diethylene glycol. The final powder has a total dispersion of 99.8; auto dispersion of 80.

Example VI 1100 parts of press cake containing 210 parts of the barium salt of the product obtained when chlortoluidine sulfonic acid is diazotized and coupled with beta naphthol are placed in a Werner-Pfleiderer dough mixer along with 5 parts of the sodium salt of the condensation product of formaldehyde and naphthalene sulfonic acid and 300 parts of yellow dextrine and mixed for 4 hours. The very thin slurry is then poured into trays and dried in vacuo at 65° C. maximum. The dry material is then ground and placed in the dough mixer with about 20 per cent of water and kneaded as a thick plastic mass for 3 hours. The thick mass is then thinned down somewhat by the addition of 20 per cent of water, poured into trays and dried in vacuo at 65° C. The dry cake is pulverized and reduced to type strength by the addition of the required quantity of cerelose and 1 per cent (calculated on final weight of the powder) of ethyl ether of diethylene glycol.

Example VII 83 parts of a dry yellow pigment which is prepared by diazotizing meta nitro paratoluidine and coupling with acetoacetanilide are dissolved in 1300 parts of 94 per cent sulfuric acid at 0° C. The temperature of the resultant clear dark amber colored solution is kept at 0° C. and 250 parts of blanc fixe added thereto with constant stirring. The mass is stirred for 10 minutes after the addition of the blanc fixe and then poured very rapidly with constant agitation into a mixture of 10,000 parts of ice and 10,000 parts of water. The precipitate is washed several times by decantation and then filtered by suction and washed free from acid. The filter cake is then introduced into a Werner-Pfleiderer dough mixer along with 6.6 parts of the sodium salt of the condensation product of formaldehyde and naphthalene sulfonic acid and 333 parts of yellow dextrine. The rather thin slurry is mixed for four hours and then poured into trays and dried in vacuo at a temperature not to exceed 65° C. The dry material is then ground and placed in the dough mixer with approximately 20 per cent of water and worked as a thick plastic mass for 3 hours. The plastic mass is poured into trays and dried in vacuo at 65° C. The dry cake is then pulverized and cut to the desired strength by blending with the necessary quantity of cane sugar and one per cent (calculated on the final weight of the powder) of the ethyl ether of diethylene glycol.

Example VIII 226 parts of a press cake containing 41 parts of a red pigment which is prepared by diazotizing 4 chloro 2 amino toluene and coupling with o-toluidide of beta hydroxynaphthoic acid are placed in a Werner-Pfleiderer dough mixer along with 1 part of the sodium salt of the condensation product of formaldehyde and naphthalene sulfonic acid and 59 parts of yellow dextrine and agitated for 4 hours. The rather thin slurry is poured into trays and dried in an air oven at temperatures not exceeding 90° C. The dry material is ground and then returned to the dough mixer along with 20–25 per cent of water and worked as a plastic mass for 3 hours. The plastic magma is poured into trays and dried in vacuo at 65° C. maximum temperature. The dry cake is pulverized and reduced to the desired strength by the addition of cerelose and 1 per cent (calculated on final weight of the powder) and ethyl ether of diethylene glycol.

Autodispersibility test

The power of dispersing in water practically instantaneously is of great importance in obtaining readily uniform dispersions without excessive stirring. Autodispersibility is measured by a simple test in general use by The Calco Chemical Company. A closely woven cotton cloth (28 picks per inch), such as is used in laundry bleaching or bluing bags is cut into four inch squares and a square fastened over the mouth of an eight ounce bottle, being held by an elastic. One gram of the powder to be tested is placed on the cloth and 25 cc. of water is caused to flow over it from a pipette at a rate such that it takes approximately 80 seconds for the 25 cc. to flow through. The amount of powder remaining on the cloth is weighed and the calculated percentage passing through is termed the percentage of autodispersibility. This test is a practical one and really measures speed and not completeness of dispersion as an extremely soluble solid will show approximately 100% autodispersibility. It has been shown in practice that no distinction in effectiveness can be noted between a material having 90% autodispersibility and one having 100%. However when the autodispersibility drops below 75% the product is distinctly inferior.

Total dispersibility

Where total dispersibility is given as a percentage, this percentage is based on the proportion of dye particles which are present in a dispersion with moderate stirring in an aqueous medium in the form of ultimate pigments particles. It is of equal importance with the high percentage of total dispersion that the remaining very small percentage of aggregates larger than an ultimate pigment particle are relatively small in size, but in general it has been found that the two properties are closely parallel. Thus, if the percentage of total dispersion is 90% or over, it will be found that the remaining aggregates are very small as well as few in number and are not visible as specks. The total dispersibility is of even greater importance than autodispersibility because while it is possible to use practically under commercial conditions, material having an autodispersibility of 75% or over, material having as low a total dispersibility as 75% would not be suitable because aggregates of visible size would then normally be present. It should be noted that ordinary stirring is not effective in breaking up large aggregates in a material in which the particles are not coated with a film of protective agent. The coating of a large majority of the ultimate pigment particles with the film of hydrophilic protective agent may therefore be considered as the basic essential of the present invention but this property cannot be measured directly. It is only determined or measured by the effects which it produces namely autodispersibility and total dispersibility, particularly the latter, because a moderate degree of autodispersibility can be obtained with powerful wetting agents which will disperse relatively coarse aggregates very rapidly. These two effects or properties therefore are used as measures of the fundamental characteristic of the present invention namely the coating of the ultimate particles of pigment with the hydrophilic protective agent.

Total dispersibility is tested in the conventional manner; namely, by examining the aqueous dispersion of the pigment under a microscope using a magnification sufficiently high to resolve ultimate pigment particles. The percentage of particles in a given portion of the field showing aggregation are determined by counting and subtracting from 100% giving the percentage of total dispersibility. The test also determines the maximum size of undispersed particles.

In the claims the term "protective agent" is used to define the class of compounds having the physical properties of forming adherent films which are soluble or swell with water, which properties are possessed by the typical materials recited in the specification under the heading "Protective agents". It should be understood that the phrase, as used in the claims, has no other meaning.

We claim:

1. A powder having as its major coloring component a water insoluble azo color, a sufficient portion of the individual color particles being coated with an autodispersibility producing "protective agent" in an amount sufficient so that the powder as a whole possesses an autodispersibility of not less than 75% and a total dispersibility of not less than 90% with a substantial freedom from aggregates in the total dispersion visible as discrete particles by the naked eye.

2. A product according to claim 1 in which the "protective agent" is dextrine.

3. A powder according to claim 1 in which the azo dye is obtained by coupling diazotized dinitroaniline or betanaphthol.

4. A powder according to claim 1 in which the coloring matter is Hansa Yellow obtained by coupling diazotized metanitroparatoluidine with acetoacetanilide.

5. A powder according to claim 1 in which the coloring matter is prepared by dye coupling diazo 4-chloro 2-amino toluidine with the orthotoluidide of betahydroxy naphthoic acid.

MOSES L. CROSSLEY.
ROY H. KIENLE.
ALFRED L. PEIKER.